Patented Jan. 10, 1928.

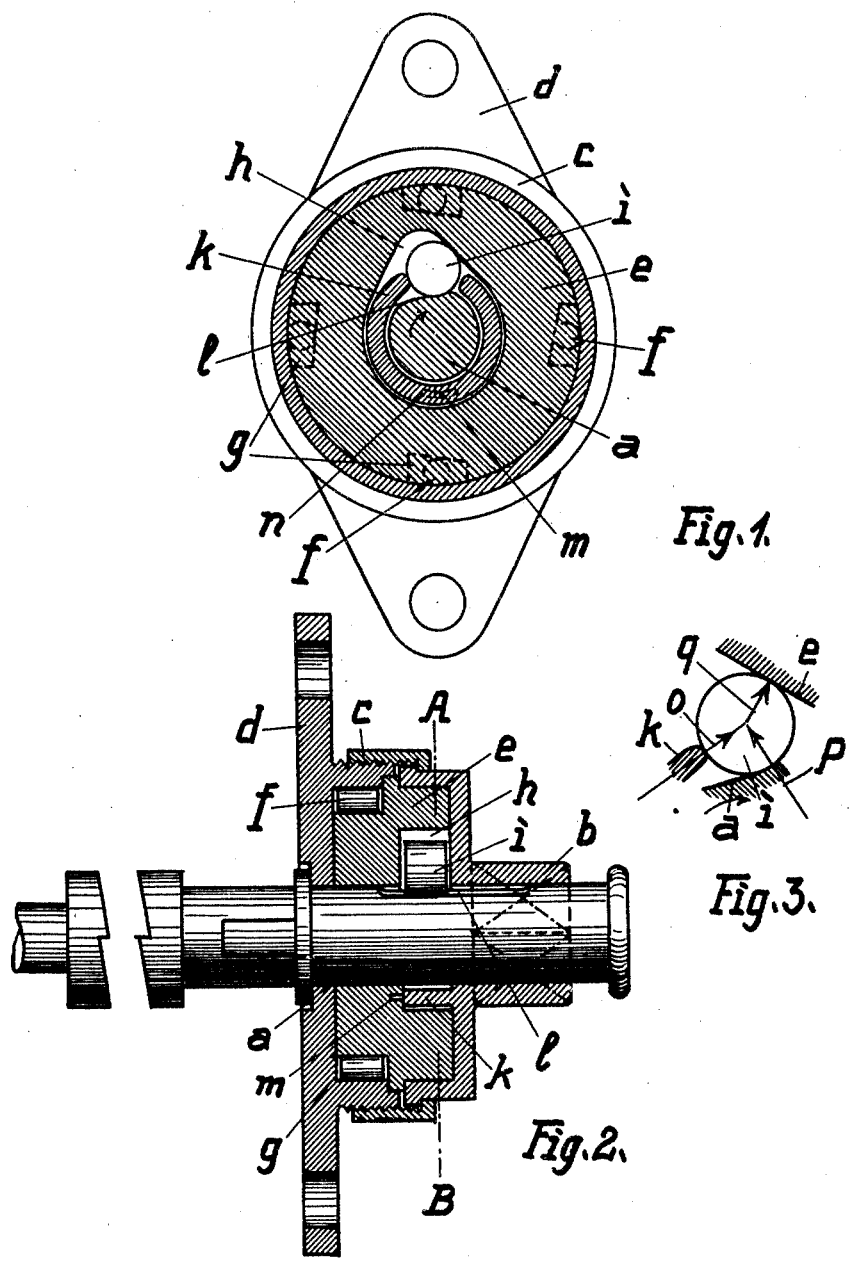

1,656,062

UNITED STATES PATENT OFFICE.

MAX HARKE, OF FRANKFORT-ON-THE-MAIN, GERMANY.

STARTING CRANK FOR EXPLOSION ENGINES LOCKED AGAINST BACK ROTATION.

Application filed May 18, 1926, Serial No. 109,934, and in Germany March 25, 1926.

This invention relates to a starting crank for explosion engines of any type which is locked against back rotation and in which the shaft of the apparatus connected with the motor shaft by claw-coupling has a recess with which engages a catch element movably mounted in a catch body rotated with the crank and designed to couple the crank and the shaft for starting the motor. This catch- or coupling-element is however disengaged immediately if the direction of rotation of the motor shaft changes owing to advance ignition, the disengaging being effected by means of a stop fixed on a rotary body supported on the motor casing so that it cannot participate in this back rotating movement.

According to the invention a roller-shaped catch element engages through a slot in the catch body of the crank with a recess of the shaft of the apparatus and is guided in a recess of a link which is connected with a rotating body locked against back-rotating, the bearing points of the roller-shaped catch- or clutch-element on the three enclosing bodies being selected in such a manner, that the resultant of the pressure exerted by the crank handle-catch and of the pressure produced by the resisting shaft of the apparatus acts perpendicularly upon the link-body so that no rotating moment is exerted upon this link-body and the coupling element is wedged in its clutch position and ensures thus a rigid coupling at the starting movement, between the link-body, crank-catch and shaft of the apparatus. At a back rotation of the shaft of the apparatus due to advanced ignition said catch-element is lifted out by the recess in the back-sliding shaft and pushed back into the slot of the link.

The connection between the crank catch and the link body may have play depending on the rolling movement of the catch element between the three bodies, said play being ensured for instance by means of a stud guided in a slot, so that the crank can, at advancing ignition, move back only for the length of this play.

An embodiment of the invention is shown, by way of example, in the accompanying drawing in which Fig. 1 shows the starting crank in cross section.

Fig. 2 is a longitudinal section of Fig. 1.

Fig. 3 shows the pressure directions during the rigid coupling of the bodies.

Referring to the drawing $a$ is the shaft of the apparatus adapted to be coupled with the motor shaft by means of a claw-coupling. The crank handle is mounted on a catch body $b$ which is for instance of square cross section. The crank-catch body $b$ is rotatably or slidingly connected by a nipple or lip to a ring nut $c$ with a support $d$ fixed by means of screw threads on the motor casing. A link body $e$ is loosely mounted on shaft $a$ and enclosed between the catch body $b$ and the support $d$, bearing-rollers $f$ serving to guide the link body $e$ on a flange of the support $d$. Owing to the slots $g$ in which the bearing-rollers $f$ are located this ring-shaped link body $e$ can rotate only in the starting direction but is stopped, as soon as the direction of movement is reversed. This link body $e$ has a slot-shaped recess $h$ in which a catch roller $i$ is located. This catch roller $i$ engages further, through a slot in the sleeve $k$ of the catch body $b$, with a recess $l$ in the shaft $a$ of the apparatus.

As shown in Fig. 3 the pressure exerted by the catch sleeve $k$ upon the catch roller $i$ acts in the direction of the arrow $o$. The pressure exerted upon the catch roller $i$ by the resisting shaft $a$ acts in the direction of the arrow $p$. From these two pressure directions results a resultant indicated by the arrow $q$. If this resultant $q$ acts perpendicularly upon the link body $e$ no turning moment is exerted upon the catch roller $i$ and the catch roller $i$ is merely supported by the sleeve. The catch roller is consequently wedged between the bodies $a$, $k$ and $e$ and a rigid connection is produced between these three bodies so that by the sleeve $k$ of the crank catch $b$ the shaft $a$ of the apparatus as well as the link body $e$ and the catch roller $i$ wedged between the same may be drawn along to make the motor shaft start.

If, owing to advanced ignition, the normal direction of rotation of shaft $a$ indicated by an arrow in Figs. 1 and 3 should be reversed, this shaft $a$ will, in consequence of the shape of its recess $l$ push the catch-roller $i$ upward into the recess $h$ of the link body $e$, which, owing to the rollers $f$, $g$ being locked against back-rotation, is itself secured against back rotation.

It is advisable to give a slight play for the catch sleeve $k$ of the crank and the link body $e$ through the arrangement of a slot $n$ and a catch pin $m$, this play being great enough to carry through entirely or partly the rolling movement of the catch-roller $i$ out of the range of the recess $l$ of shaft $a$. The backward rotation of crank catch body $b$ and consequently of the crank can be considerably reduced by this slot as the catch-roller $i$ is squeezed out of the gap very rapidly as soon as it has been slightly lifted out of the wedged position, the crank catch sleeve $k$ and the link body $e$ being capable only of a very limited mutual rotation.

For regulating the direction of the energy to a stationary position of the link body $e$ special auxiliary means may be used, the link body $e$ being for instance arranged for intercepting small turning moments which might occur, this intercepting being due to adjustable braking pressure.

I claim:—

1. A starting crank for explosion engines locked against back rotation, comprising in combination with the motor shaft, a shaft for the crank handle, said shaft having a recess, a catch body rigidly connected with said crank handle, a catch roller movably mounted in said catch body, a support fixed on the engine casing, a link-body mounted in said support casing and having a slot through which said catch roller engages with said recess of said shaft and recesses in the face engaging with said support, bearing rollers one in each short recess for locking said link body against back rotation.

2. A starting crank for explosion engines locked against back rotation, comprising in combination with the motor shaft, a shaft for the crank handle, said shaft having a recess, a catch body rigidly connected with said crank handle, a catch roller movably mounted in the link, a support fixed on the engine casing, a sleeve mounted in said support casing and having a slot through which said catch roller engages with said recess of the shaft of the apparatus and two short recesses in the face engaging with said support, and bearing rollers one in each short recess for locking said link body against back rotation, and a pin of said crank-catch body guided in a slot of said link body to connect said link body with play with said crank catch.

In testimony whereof I affix my signature.

MAX HARKE.